(12) United States Patent
Abe et al.

(10) Patent No.: US 10,934,073 B2
(45) Date of Patent: Mar. 2, 2021

(54) GUSSET BAG AND BAG-IN-BOX

(71) Applicant: HOSOKAWA YOKO CO., LTD., Tokyo (JP)

(72) Inventors: Kazuya Abe, Iruma-gun (JP); Tomonari Shinohara, Iruma-gun (JP); Raizo Kuge, Hanno (JP)

(73) Assignee: HOSOKAWA YOKO CO., LTD., Tokyo (JP)

( * ) Notice: Subject to any disclaimer, the term of this patent is extended or adjusted under 35 U.S.C. 154(b) by 0 days.

(21) Appl. No.: 16/552,491

(22) Filed: Aug. 27, 2019

(65) Prior Publication Data

US 2020/0071049 A1    Mar. 5, 2020

(30) Foreign Application Priority Data

Aug. 30, 2018  (JP) .............................. JP2018-161840

(51) Int. Cl.
| | | |
|---|---|---|
| *B65D 77/06* | (2006.01) | |
| *B65D 75/58* | (2006.01) | |
| *B65D 75/56* | (2006.01) | |
| *B65D 75/00* | (2006.01) | |

(52) U.S. Cl.
CPC ......... *B65D 77/065* (2013.01); *B65D 75/008* (2013.01); *B65D 75/566* (2013.01); *B65D 75/5872* (2013.01)

(58) Field of Classification Search
CPC .. B65D 77/065; B65D 75/008; B65D 75/566; B65D 75/5872; B65D 31/10; B65D 33/08; B65D 75/563; B65D 75/5866; B31B 70/266

USPC .......... 229/117.3, 117.35, 204; 383/120, 10, 383/906; 493/226
See application file for complete search history.

(56) References Cited

U.S. PATENT DOCUMENTS

| | | | | |
|---|---|---|---|---|
| 5,788,121 A | * | 8/1998 | Sasaki ................. | B65D 77/065 222/105 |
| 9,284,096 B2 | * | 3/2016 | Kessler, Jr. .......... | B65D 33/065 |
| 10,035,318 B2 | * | 7/2018 | Berger ................... | B31B 70/00 |
| 10,252,848 B2 | * | 4/2019 | Murray ................... | B65D 3/30 |
| 2011/0069908 A1 | | 3/2011 | Wilkes et al. | |

(Continued)

FOREIGN PATENT DOCUMENTS

JP          02-008763          1/1990

*Primary Examiner* — Christopher R Demeree
(74) *Attorney, Agent, or Firm* — Nixon Peabody LLP; Jeffrey L. Costellia

(57) ABSTRACT

A gusset bag of the present invention includes a pair of flat surface portions, a pair of side surface portions, a content storing portion which is formed of the pair of flat surface portions and the pair of side surface portions and stores contents therein, an upper content non-storing portion which is provided above the content storing portion and stores no contents therein, a mouth portion provided on one of the pair of flat surface portions, a storing portion upper seal portion which is provided above the mouth portion and partitions the content storing portion and the upper content non-storing portion, an upper cut that has a shape in which at least one portion of a periphery of a predetermined region of the upper content non-storing portion on the storing portion upper seal portion side is not cut and another portion of the periphery is cut, and is formed to penetrate the pair of flat surface portions, and a penetrating portion provided in the predetermined region.

13 Claims, 3 Drawing Sheets

(56) References Cited

U.S. PATENT DOCUMENTS

2014/0185966 A1\* 7/2014 Umenaka ............... B65D 83/28
 383/120
2015/0125097 A1\* 5/2015 Kenmotsu .......... B65D 75/5883
 383/104

\* cited by examiner

GUSSET BAG AND BAG-IN-BOX

BACKGROUND OF THE INVENTION

Field of the Invention

The present invention relates to a gusset bag and a bag-in-box.

Priority is claimed on Japanese Patent Application No. 2018-161840, filed Aug. 30, 2018, the content of which is incorporated herein by reference.

Description of Related Art

In recent years, when various liquids such as seasonings, liquors, beverages including mineral water and the like, and industrial chemicals have been transported and stored, bag-in-boxes which are disposable type containers have been widely used.

A bag-in-box is configured of an inner container filled with contents, such as a flat bag or a gusset bag made of a plastic film, a blow bottle obtained by blow molding of molten plastic, and so on, and an outer container accommodating the inner container, such as a cardboard box. Also, a bag-in-box is configured such that the inner container has water resistance for a contained liquid, chemical resistance, a gas barrier property or the like, and also abrasion resistance and impact resistance or the like against rubbing and collision with the outer container resulting from shaking during transportation, etc., while the outer container has rigidity required for transportation and storage. In addition, the inner container is provided with a mouth portion for filling and discharging contents, and the outer container is provided with a portion through which the mouth portion can protrude.

A gusset bag made of a plastic film, which has a shape that follows the shape of the outer container, such as a substantially rectangular parallelepiped shape or a substantially cubic shape, when the contents are filled therein, is often used as the inner container of the bag-in-box. The gusset bag includes a pair of flat surface portions and a pair of side surface portions folded in a V shape. Since the gusset bag has a larger volume compared to a bag without side surface portions, a large volume of contents can be filled therein.

The mouth portion of the gusset bag, which is the inner container of the bag-in-box, is attached with an opening provided in one flat surface portion, a mouth portion member having a flange portion provided to protrude outward from the inside of the opening, and the flange portion joined to the inside of the flat surface portion.

Japanese Unexamined Utility Model Application Publication No. H02-8763 (hereinafter referred to as Patent Document 1) discloses a configuration in which a grip portion is provided on an upper portion of a gusset bag for taking the gusset bag (a bag body for a bag-in-box), which is an inner container of a bag-in-box, out of an outer container and gripping it by hand.

On the other hand, U.S. Unexamined Patent Application Publication No. 2011/69908 (hereinafter referred to as Patent Document 2) discloses a container (a flexible container). The container (a gusset bag) can be gripped by hand at upper and lower sides thereof, and a mouth portion is provided to face upward at a central portion of a top portion of the container.

In the guest bag disclosed in Patent Document 1, the grip portion gripped by hand and the mouth portion are both provided at a top portion of the gusset bag having a substantially rectangular parallelepiped shape or a substantially cubic shape. For this reason, when the gusset bag is gripped by hand and lifted up, the mouth portion faces obliquely upward, which may make it difficult to discharge contents. In addition, since only the top portion (upper portion) of the gusset bag is gripped by hand, there is a possibility that it may be difficult to discharge the contents in a fixed direction without the direction of the mouth portion being stabilized during discharging of the contents, in particular, when there is a large amount of the contents.

The flexible container (gusset bag) disclosed in Patent Document 2 can be gripped by hand at the upper and lower sides, and the contents are easily discharged. However, since the pair of flat surface portions and the pair of side surface portions are joined at a side surface of an outer circumference of the mouth portion in a circumferential direction thereof, inner end edges of joining portions between the flat surface portions and the side surface portions abut the side surface of the mouth portion. Since places where the inner end edges abut the side surface of the mouth portion may have insufficient adhesion of joining, there is a possibility of a so-called tunnel phenomenon easily occurring and causing the contents to leak out.

The present invention has been made in view of the circumstances described above, and it is an object of the present invention to provide a gusset bag which can be gripped by hand to easily discharge contents, can discharge the contents stably in a fixed direction, and has no possibility of the contents leaking out, and a bag-in-box using the gusset bag as an inner container.

SUMMARY OF THE INVENTION

In order to solve the problems mentioned above, a gusset bag according to a first aspect of the present invention includes a pair of flat surface portions, a pair of side surface portions, a content storing portion which is formed of the pair of flat surface portions and the pair of side surface portions and stores contents therein, an upper content non-storing portion which is provided above the content storing portion and stores no contents therein, a mouth portion provided on one of the pair of flat surface portions, a storing portion upper seal portion which is provided above the mouth portion and partitions the content storing portion and the upper content non-storing portion, an upper cut that has a shape in which at least one portion of a periphery of a predetermined region of the upper content non-storing portion on the storing portion upper seal portion side is not cut and another portion of the periphery is cut, and is formed to penetrate the pair of flat surface portions, and a penetrating portion provided in the predetermined region.

In the first aspect of the present invention, the mouth portion may be formed of a tubular portion and a flange portion, the penetrating portion may be a through-hole having a substantially circular shape, and the diameter of the through-hole may be greater than the outer diameter of the tubular portion of the mouth portion.

In the first aspect of the present invention, the storing portion upper seal portion may substantially come into contact with the flange portion of the mouth portion.

The gusset bag according to the first aspect of the present invention may further include a lower content non-storing portion which is provided below the content storing portion and stores no contents therein, a storing portion lower seal portion which partitions the content storing portion and the lower content non-storing portion, and a lower cut which is provided in the lower content non-storing portion and is formed to penetrate the pair of flat surface portions.

In the first aspect of the present invention, the gusset bag may be a double bag.

In the first aspect of the present invention, the gusset bag may be an inner container of a bag-in-box accommodated in an outer container.

In the first aspect of the present invention, the mouth portion may include the tubular portion, and the penetrating portion may be provided in the predetermined region such that the tubular portion of the mouth portion passes through the penetrating portion when the predetermined region is bent with the one portion as a bending line.

In the first aspect of the present invention, the mouth portion may include the tubular portion, and the penetrating portion and the tubular portion of the mouth portion may be disposed in line symmetry with respect to the one portion.

A bag-in-box according to a second aspect of the present invention includes the gusset bag accommodated in the outer container.

According to each aspect of the present invention, it is possible to provide a gusset bag which can be gripped by hand to easily discharge contents, can discharge the contents stably in a fixed direction, and has no possibility of the contents leaking out, and a bag-in-box using the gusset bag as an inner container.

PREFERRED EMBODIMENTS

Figure 1:
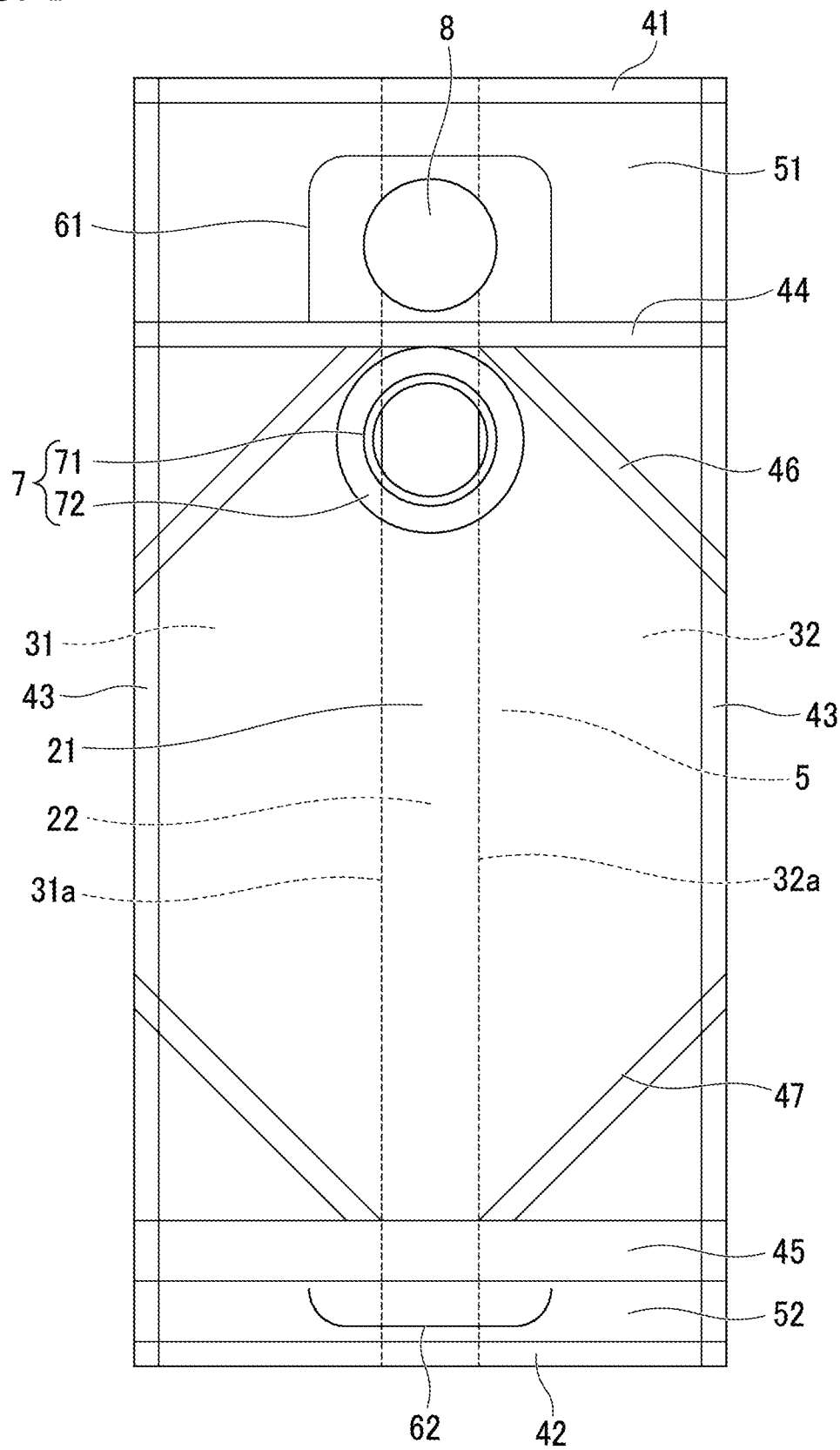
FIG. 1 is an external view showing a flat state gusset bag according to an embodiment of the present invention.
Figure 2:
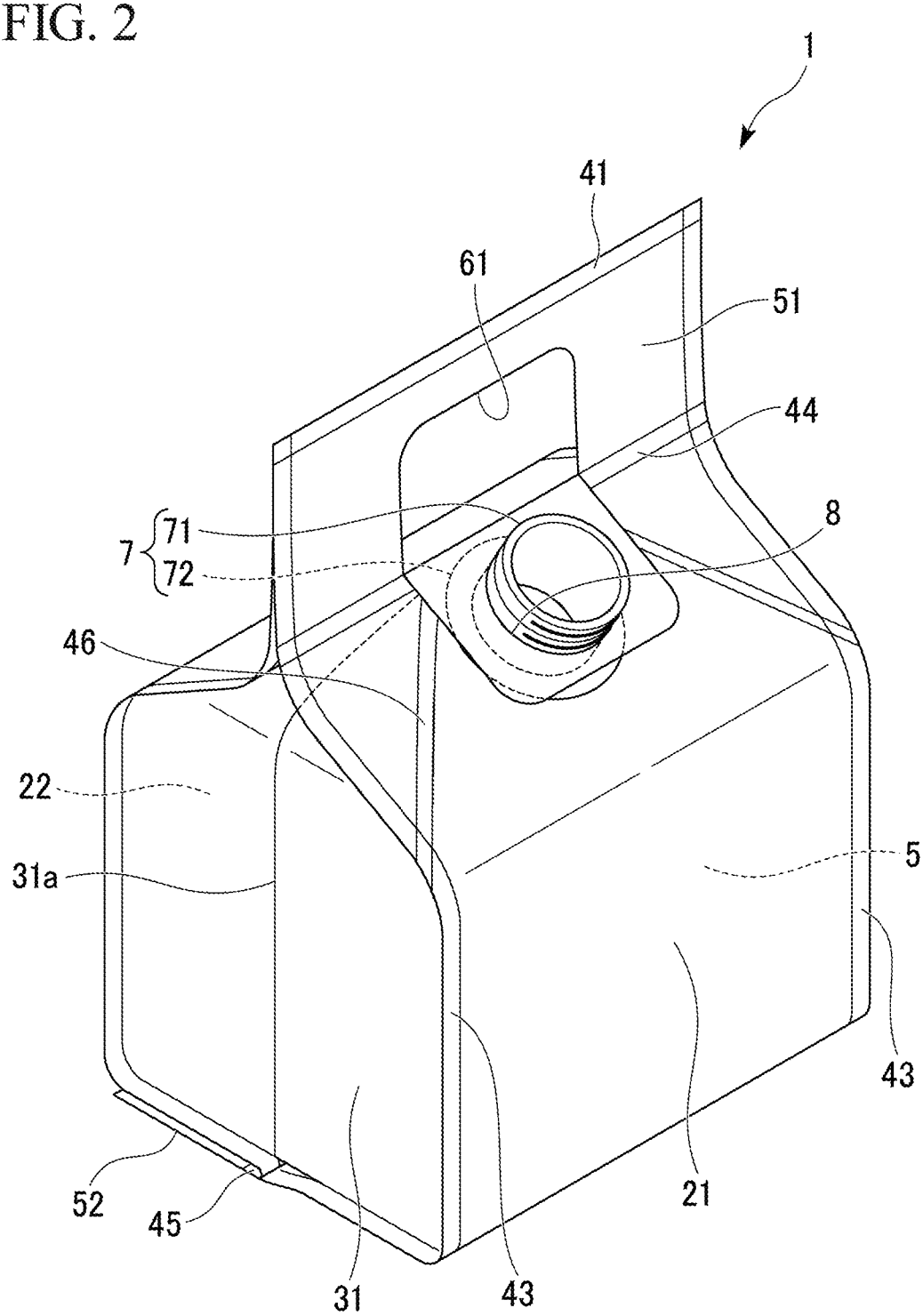
FIG. 2 is an external view showing a state in which contents are stored in the gusset bag according to the embodiment of the present invention.

Hereinafter, a gusset bag 1, which is an inner container of a bag-in-box according to one embodiment of the present invention, will be described in detail with reference to the drawings. First, a shape of the gusset bag 1 according to the present embodiment will be described. FIG. 1 is an external view showing a flat state gusset bag 1 according to the present embodiment. FIG. 2 is an external view showing a state in which contents are stored in the gusset bag 1 according to the present embodiment. In the following description, a side on which a mouth portion 7, which will be described later, of the gusset bag 1 is provided is referred to as an upper side, a side opposite thereto is referred to as a lower side, and a direction orthogonal to a vertical direction and along flat surface portions 21 and 22, which will be described later, is referred to as a lateral direction.

The gusset bag 1 according to the present embodiment is formed of a film made of a plastic or the like, and has a gusset shape configured of a pair of flat surface portions 21 and 22 and a pair of side surface portions 31 and 32. Each of the side surface portions 31 and 32 is formed by half-folding the film at fold lines 31a and 32a. In addition, the side surface portions 31 and 32 are disposed in a state in which the half-folded fold lines 31a and 32a are brought close to each other and face each other. The pair of side surface portions 31 and 32 are sandwiched by the pair of flat surface portions 21 and 22, and end edges thereof are heat-sealed.

In the present embodiment, the gusset bag 1 is a double bag configured of an outer bag and an inner bag. That is, each of the pair of flat surface portions 21 and 22 and the pair of side surface portions 31 and 32 forming the gusset bag 1 is configured of two films of a film forming the outer bag and a film forming the inner bag.

An upper end portion, a lower end portion, and left and right end portions of the gusset bag 1 are respectively closed by an upper end seal portion 41, a lower end seal portion 42 and side seal portions 43 which are formed by heat-sealing. In addition, the gusset bag 1 includes a content storing portion 5 which is formed by the pair of flat surface portions 21 and 22 and the pair of side surface portions 31 and 32 and stores contents therein.

The gusset bag 1 includes an upper content non-storing portion 51 below the upper end seal portion 41 and above the content storing portion 5, and a storing portion upper seal portion 44 formed by heat-sealing, which partitions the content storing portion 5 and the upper content non-storing portion 51, is provided in the gusset bag 1. The gusset bag 1 includes a lower content non-storing portion 52 above the lower end seal portion 42 and below the content storing portion 5, and a storing portion lower seal portion 45 formed by heat-sealing, which partitions the content storing portion 5 and the lower content non-storing portion 52, is provided in the gusset bag 1. An upper end and a lower end of the content storing portion 5 are respectively closed by the storing portion upper seal portion 44 and the storing portion lower seal portion 45.

The contents are not stored in the upper content non-storing portion 51 partitioned by the upper end seal portion 41 and the storing portion upper seal portion 44, and in the lower content non-storing portion 52 partitioned by the lower end seal portion 42 and the storing portion lower seal portion 45, and an upper cut 61 and a lower cut 62 are formed in the upper content non-storing portion 51 and the lower content non-storing portion 52, respectively.

The mouth portion 7, which will be described later, is provided in one flat surface portion 21 below the storing portion upper seal portion 44.

Upper inclined seal portions 46 are provided in the gusset bag 1 to extend from respective intersections of the storing portion upper seal portion 44 and the fold lines 31a and 32a of the side surface portions 31 and 32 through the content storing portion 5 toward the side seal portions 43. Similarly, lower inclined seal portions 47 are provided in the gusset bag 1 to extend from respective intersections of the storing portion lower seal portion 45 and the fold lines 31a and 32a of the side surface portions 31 and 32 through the content storing portion 5 toward the side seal portions 43.

The upper cut 61 forms a portion for gripping the gusset bag 1 by hand in the upper content non-storing portion 51. In addition, a through-hole 8 that is a penetrating portion, which will be described later, is formed in a region surrounded by the upper cut 61.

The upper cut 61 is a cut having a shape in which at least one portion of the periphery (a circumferential line), which surrounds a predetermined region, on the storing portion upper seal portion 44 side is not cut, and another portion of the periphery (the circumferential line) is cut. In the present embodiment, the upper cut 61 has a shape in which a portion which becomes a bottom side of a substantially rectangular shape in the periphery surrounding a substantially rectangular region that includes a part of the upper end of the storing portion upper seal portion 44 as a bottom side is not cut, and another portion of the periphery is cut. That is, the upper cut 61 is a cut in which a portion other than the bottom side on the storing portion upper seal portion 44 side has a substantially inverted U shape that penetrates the gusset bag 1.

The upper cut 61 is formed to penetrate the gusset bag 1. That is, it is formed to penetrate both of the flat surface portions 21 and 22. The cut is formed also by penetrating the side surface portions 31 and 32 at places where the side surface portions 31 and 32 overlap the position of the upper cut 61. In addition, the substantially rectangular region surrounded by the upper cut 61 is bent and pressed down with the bottom side of the substantially rectangular shape that is not cut as a bending line, and thus a hole for gripping the gusset bag 1 by hand is formed.

The size of the upper cut 61 may be a size including the through-hole 8, which will be described later, inside the substantially rectangular region, and the size is preferably large enough for four fingers of the human hand, excluding the thumb, to enter. For example, the length of the upper and lower sides of the substantially rectangular shape is preferably 70 mm to 100 mm, and the height of the substantially rectangular shape is preferably 60 mm to 100 mm.

The upper cut 61 is formed in the upper content non-storing portion 51 such that the upper cut 61 can be gripped by hand, and the shape of the upper cut 61 is not limited to the substantially inverted U shape around the substantially rectangular region, and any shape may be used as long as the through-hole 8, which will be described later, is included in the region surrounded by the upper cut 61. For example, the upper cut may be a cut having a shape in which at least one portion on the storing portion upper seal portion 44 side of the periphery surrounding an oval-shaped region extending in the lateral direction is not cut, and another portion of the periphery is cut.

The through-hole 8 penetrating the gusset bag 1 is provided in the predetermined region surrounded by the upper cut 61. The through-hole 8 is substantially circular. The diameter of the through-hole 8 is greater than an outer diameter of a tubular portion 71 of the mouth portion 7 such that the tubular portion 71 of the mouth portion 7, which will be described later, can pass therethrough, and is preferably not too large, but slightly greater than the outer diameter of the tubular portion 71. Also, even in the case in which the diameter of the through-hole 8 is equal to or slightly smaller than the outer diameter of the tubular portion 71 of the mouth portion 7, when a film constituting the gusset bag 1 can be extended, the tubular portion 71 of the mouth portion 7 can pass therethrough, and thus it is preferable in that the tubular portion 71 can be securely held. In an outer circumferential portion of the through-hole 8 or a portion along the upper cut 61, in order to prevent films forming the flat surface portions 21 and 22 and the side surface portions 31 and 32 from being separated by the through-hole 8 or the upper cut 61 penetrating the gusset bag 1, the films of the outer circumferential portion of the through-hole 8 or of the portion along the upper cut 61 may be heat-sealed to integrally connect the respective films.

Further, as long as the penetrating portion causes the tubular portion 71 of the mouth portion 7, which will be described later, to pass therethrough, a penetrating cross-shaped or radial cut may be formed instead of the through-hole. In this case, the cut is formed to penetrate both flat surface portions 21 and 22. That is, in this case, the penetrating portion is formed by the cross-shaped or radial cut. However, as will be described later, in order to provide an effect of the penetrating portion when the mouth portion 7 is pulled toward the upper side of the gusset bag 1, a through-hole that can hold the tubular portion 71 firmly is preferable.

The lower cut 62 is formed in the lower content non-storing portion 52 to penetrate the pair of flat surface portions 21 and 22, and is a cut that forms a portion for gripping the gusset bag 1 by hand.

The lower cut 62 in the present embodiment is a cut having a shape in which at least a portion on the storing portion lower seal portion 45 side in the periphery of the predetermined region is not cut, and another portion in the periphery is cut. In the present embodiment, the lower cut 62 has a shape in which a portion that becomes a top side of a substantially rectangular shape in the periphery surrounding a substantially rectangular region having a part of the lower end of the storing portion lower seal portion 45 as a top side is not cut, and another portion of the periphery is cut. That is, the lower cut 62 is a cut in which a portion other than the top side on the storing portion lower seal portion 45 side having a substantially U shape that penetrates the gusset bag 1.

Also, the shape of the lower cut 62 is not limited to the shape of the present embodiment. For example, the shape of the lower cut 62 may be a shape in which the periphery surrounding the substantially rectangular region includes a part of the upper end of the lower end seal portion 42 as a bottom side, the bottom side of the periphery is not cut, and another portion thereof is cut. Further, all the sides of the periphery surrounding the substantially rectangular region of the lower cut 62 may pass through the pair of flat surface portions 21 and 22, that is, the lower cut 62 may be a through-hole in which the substantially rectangular region is cut. In addition, the lower cut 62 is a portion for being gripped by hand, and may have any shape as long as it can be gripped by hand in the lower content non-storing portion 52.

The mouth portion 7 is for pouring the contents in and out of the content storing portion 5, and is a publicly known configuration including the tubular portion 71 and a flange portion 72. The tubular portion 71 has a cylindrical shape, is provided with a screw portion on an outer circumference thereof, and can be sealed by a cap (not shown) having a screw portion provided therein being fitted thereon. The flange portion 72 extends in a circular shape from a lower end of the tubular portion 71 in a horizontal direction (radially outward). A surface of the flange portion 72 on the tubular portion 71 side is a surface joined to an inner surface of the gusset bag 1. Since the gusset bag 1 of the present embodiment is a double bag, the inner surface of the gusset bag 1 described herein is an inner surface of an inner bag of the double bag. It is desirable that at least the flange portion 72 be formed of the same kind of synthetic resin or the like that can be heat-sealed with the inner surface of the gusset bag 1.

The mouth portion 7 is attached to one flat surface portion 21 of the gusset bag 1. In detail, an opening is provided in the one flat surface portion 21, and the tubular portion 71 of the mouth portion 7 protrudes from the inside of the gusset bag 1 to the outside thereof through the opening of the one flat surface portion 21. The surface of the flange portion 72 of the mouth portion 7 on the tubular portion 71 side is joined to the inner surface of the gusset bag 1 by heat-sealing. For this reason, unlike the configuration disclosed in Patent Document 2, inner end edges of joining portions between the flat surface portions and the side surface portions of the gusset bag do not abut a side surface of the mouth portion. Therefore, since the adhesion between the mouth portion 7 and the gusset bag 1 does not become insufficient and the tunnel phenomenon does not occur, leakage of the contents from joining places between the mouth portion 7 and the gusset bag 1 is inhibited.

The upper inclined seal portions 46 and the storing portion upper seal portion 44 of the gusset bag 1 are substantially in contact with an outer circumference of the flange portion 72 of the mouth portion 7. Here, the expression "substantially in contact" includes a state in which it is in contact with these seal portions and a state in which it is slightly separated therefrom.

As shown in FIG. 2, the content storing portion 5 of the gusset bag 1 filled with the contents extends in a substantially cubic shape or substantially rectangular parallelepiped shape in which the storing portion upper seal portion 44 becomes a center line of a top portion thereof and the storing portion lower seal portion 45 becomes a center line of a bottom portion thereof. Since the storing portion upper seal portion 44 is substantially in contact with the outer circumference of the flange portion 72 of the mouth portion 7, the mouth portion 7 approaches a central portion of the top portion of the content storing portion 5. Further, since two upper inclined seal portions 46 substantially come into contact with the outer circumference of the flange portion 72 of the mouth portion 7, the mouth portion 7 is supported from three directions so that the direction of the mouth portion 7 becomes stable, and thus it is possible to perform stable discharge in a fixed direction.

Next, a use method of the gusset bag 1 of the present embodiment will be described. First, in the gusset bag 1 of the present embodiment, the contents are filled into the content storing portion 5 through the mouth portion 7. The content storing portion 5 of the gusset bag 1 filled with the contents becomes a substantially rectangular parallelepiped shape or a substantially cubic shape. Specifically, the gusset bag 1 is bent in the vicinity of each straight line connecting respective intersections between the two lower inclined seal portions 47 and the two side seal portions 43, and a portion extending from the respective bent portion to the storing portion lower seal portion 45 becomes a bottom portion of the content storing portion 5. Also, the gusset bag 1 is bent in the vicinity of each straight line connecting respective intersections between the two upper inclined seal portions 46 and the two side seal portions 43, and a portion extending from the respective bent portion to the storing portion upper seal portion 44 becomes the top portion of the content storing portion 5. In addition, the content storing portion 5 becomes a substantially rectangular parallelepiped shape or a substantially cubic shape in which an inner edge of the storing portion lower seal portion 45 becomes a center line of the bottom portion and an inner edge of the storing portion upper seal portion 44 becomes a center line of the top portion.

Since the outer circumference of the flange portion 72 of the mouth portion 7 is provided to be substantially in contact with the storing portion upper seal portion 44 of the gusset bag 1, when the content storing portion 5 becomes a rectangular parallelepiped shape or a cubic shape, the mouth portion 7 substantially comes in contact with the storing portion upper seal portion 44 forming the center line of the top portion of the content storing portion 5. For this reason, the mouth portion 7 approaches the central portion of the top portion of the content storing portion 5, and the opening of the mouth portion 7 faces in a direction near an upward direction of the gusset bag 1.

Next, the substantially rectangular region surrounded by the upper cut 61 is bent and pressed down toward the mouth portion 7 side, the tubular portion 71 of the mouth portion 7 passes through the through-hole 8, and the substantially rectangular region is hooked on the tubular portion 71. That is, the through-hole 8 (penetrating portion) of the present embodiment is provided in the rectangular region surrounded by the upper cut 61 such that the tubular portion 71 of the mouth portion 7 passes through the through-hole 8 when the rectangular region is bent with one portion on the storing portion upper seal portion 44 side of the substantially rectangular region as a bending line. In other words, the through-hole 8 and the tubular portion 71 of the mouth portion 7 are disposed in line symmetry with each other with respect to the one portion of the rectangular region. Thus, since the substantially rectangular region is hooked on the tubular portion 71 of the mouth portion 7 and the substantially rectangular region that is bent tends to return to its original position before being bent, the mouth portion 7 is pulled in the upward direction of the gusset bag 1. For this reason, as compared with a state in which the mouth portion 7 is only fused and fixed to the one flat surface portion 21, the opening of the mouth portion 7 faces the upward direction of the gusset bag 1. Also, as compared with a state in which the mouth portion 7 is only fused and fixed to the one flat surface portion 21, the movement of the mouth portion 7 at the time of discharging the contents is inhibited and stabilized.

Figure 3:
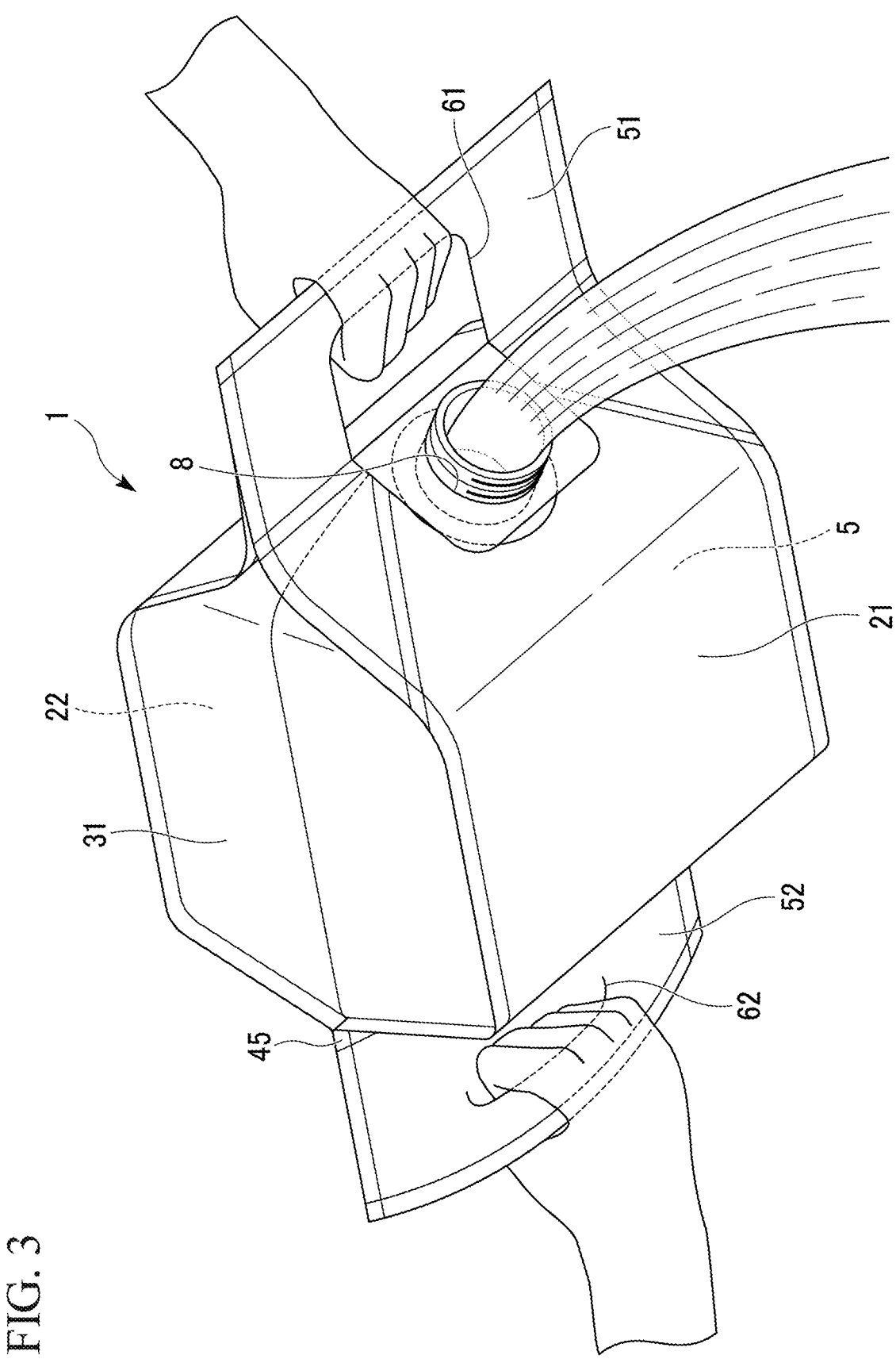
FIG. 3 is an external view showing a state in which the gusset bag according to the embodiment of the present invention is gripped with both hands to discharge the contents.

In this state, the region surrounded by the upper cut 61 in the upper content non-storing portion 51 becomes a hole, and the gusset bag 1 is gripped with one hand through this hole while the gusset bag 1 is gripped with the other hand thorough the lower cut 62. Thus, the gusset bag 1 can be gripped with both hands with the content storing portion 5 interposed therebetween. FIG. 3 is an external view showing a state in which the gusset bag 1 is gripped with both hands. As a result, the contents of the content storing portion 5 can be easily discharged, and movement of the mouth portion 7 is inhibited so that stable discharge in a fixed direction can be performed.

As described above, in the gusset bag 1 of the present embodiment, the upper content non-storing portion 51 outside and above the content storing portion 5 is provided with the upper cut 61, and thus the upper portion of the gusset bag 1 can be gripped by hand. Further, by causing the mouth portion 7 to pass through the through-hole 8 and hooking the region surrounded by the upper cut. 61 to the mouth portion 7, the opening of the mouth portion 7 faces the upward direction of the gusset bag 1. Thus, the movement of the mouth portion 7 at the time of discharging the contents is inhibited and stabilized.

Also, the mouth portion 7 includes the tubular portion 71, and the diameter of the through-hole 8 is preferably greater than the outer diameter of the tubular portion 71 so that the tubular portion 71 can easily pass through the through-hole 8. As the outer circumference of the flange portion 72 of the mouth portion 7 substantially comes into contact with the storing portion upper seal portion 44, the mouth portion 7 is located at a position close to the central portion of the top portion of the content storing portion 5 and easily faces the upward direction of the gusset bag 1. Also, as the region surrounded by the upper cut 61 is bent and pressed down toward the mouth portion 7 side, the tubular portion 71 of the mouth portion 7 passes through the through-hole 8, and the region surrounded by the upper cut 61 is hooked to the tubular portion 71, the opening of the mouth portion 7 is pulled to face upward of the gusset bag 1. Thus, the opening of the mouth portion 7 further faces the upward direction of the gusset bag 1 as compared with the state in which the mouth portion 7 is only fused and fixed to the one flat surface portion 21, and the movement of the mouth portion 7 at the time of discharging the contents is inhibited so that stable discharge in a fixed direction can be easily performed. Also, the diameter of the through-hole 8 is preferably equal to or slightly smaller than the outer diameter of the tubular portion 71 so that the through-hole 8 firmly holds the tubular portion 71 and the mouth portion 7 is pulled in the upward direction of the gusset bag 1, and thus the movement of the mouth portion 7 at the time of discharging the contents can be further inhibited. Further, since the lower cut 62 is provided in the lower content non-storing portion 52 below the content storing portion 5, the hole provided by the upper cut 61 is gripped with one hand and the hole provided by the lower cut 62 is gripped with the other hand with the content storing portion 5 interposed therebetween, and thus the gusset bag 1 can be gripped with both hands. Accordingly, the contents in the content storing portion 5 can be easily discharged, and the movement of the mouth portion 7 can be inhibited, so that stable discharge in a fixed direction can be performed.

Next, materials of the gusset bag 1 of the present embodiment will be described. In the present embodiment, the gusset bag 1 is a double bag. However, the gusset bag of the present invention is not limited to the double bag, and may be a gusset bag made of one film or three or more films. In the double bag which is the gusset bag 1 of the present embodiment, each of the pair of flat surface portions 21 and 22 and the pair of side surface portions 31 and 32 is configured of an outer bag film forming an outer bag and an inner bag film forming an inner bag.

The gusset bag used as the inner container of the bag-in-box is preferably a double bag. The bag-in-box is distributed, for example, in a state in which the inner container of the bag-in-box is filled with a liquid content of about 2 to 20 liters and the bag-in-box is accommodated in an outer container such as a cardboard box. In the distribution stage, in order to prevent the contents from leaking out through pin holes perforated in the inner container due to rubbing and impacts between the outer container and the inner container or a flow of the contents, the double bag that absorbs impacts is preferable.

The outer bag film is formed of, for example, a laminate of an outer layer film having heat resistance and impact resistance and an inner layer film having sealability. As the outer layer film, for example, a biaxially stretched polyamide film is used. However, the present invention is not limited to the biaxially stretched polyamide film, and a biaxially stretched polyethylene terephthalate film or the like may be used. Also, a biaxially stretched polyamide film or a biaxially stretched polyethylene terephthalate film on which a vapor deposited film of a metal oxide or a metal is imparted and that has a blocking effect on oxygen and moisture may be used so that the oxygen and the moisture do not permeate from the outside.

As the inner layer film, for example, an unstretched film of a polyolefin such as polyethylene including low density polyethylene, linear low density polyethylene, high density polyethylene and the like, polypropylene, and so on, or a film obtained by extruding these resins in a layered shape on the outer layer film may be used.

The outer bag film can be formed by laminating the outer layer film and the inner layer film by a known dry lamination method or extrusion lamination method. Since the inner bag film needs to be heat-sealed at the respective seal portions with the inner layer film of the outer bag film, a film made of a resin of the same material that can be heat-sealed with the inner layer film of the outer bag film can be used.

Although preferred embodiments of the present invention have been described above, the present invention is not limited to these embodiments or their modifications. In particular, the gusset bag 1 of the present embodiment includes the lower cut 62, and the storing portion upper seal portion 44 is in the form substantially in contact with the flange portion 72 of the mouth portion 7, but the gusset bag of the present invention is not limited thereto. Additions, omissions, substitutions, and other modifications of the configuration are possible without departing from the spirit of the present invention.

In the present specification, words such as "forward, rearward, top, bottom, right, left, vertical, horizontal, longitudinal, lateral, outside and inside" are used to describe directions in the configuration of the present invention. Therefore, these terms used to describe the specification of the present invention should be interpreted relatively in the configuration of the present invention.

What is claimed is:

1. A gusset bag comprising:
   a pair of flat surface portions;
   a pair of side surface portions;
   a content storing portion which is formed of the pair of flat surface portions and the pair of side surface portions and stores contents therein;
   an upper content non-storing portion which is provided above the content storing portion and stores no contents therein;
   a mouth portion only provided on one of the pair of flat surface portions;
   a storing portion upper seal portion which is provided above the mouth portion and partitions the content storing portion and the upper content non-storing portion;
   an upper cut that has a shape in which at least one portion of a periphery of a predetermined region of the upper content non-storing portion on the storing portion upper seal portion side is not cut and another portion of the periphery is cut, and is formed to penetrate the pair of flat surface portions; and
   a penetrating portion provided in the predetermined region.

2. The gusset bag according to claim 1,
   wherein the mouth portion is configured of a tubular portion and a flange portion, and
   the penetrating portion is a through-hole having a substantially circular shape and a diameter of the through-hole is greater than an outer diameter of the tubular portion of the mouth portion.

3. The gusset bag according to claim 2, wherein the storing portion upper seal portion substantially comes into contact with the flange portion of the mouth portion.

4. The gusset bag according to claim 2,
   wherein the flange portion extends outward in a radial direction of the tubular portion from an end portion of the tubular portion on an inside of the content storing portion.

5. The gusset bag according to claim 2,
wherein a surface of the flange portion on the tubular portion side is joined to an inner surface of the one flat surface portion.

6. The gusset bag according to claim 1, further comprising:
a lower content non-storing portion which is provided below the content storing portion and stores no contents therein;
a storing portion lower seal portion which partitions the content storing portion and the lower content non-storing portion; and
a lower cut which is provided in the lower content non-storing portion and is formed to penetrate the pair of flat surface portions.

7. The gusset bag according to claim 1, wherein the gusset bag is a double bag.

8. The gusset bag according to claim 1, wherein the gusset bag is an inner container of a bag-in-box accommodated in an outer container.

9. A bag-in-box comprising the gusset bag according to claim 6 accommodated in the outer container.

10. The gusset bag according to claim 1,
wherein the mouth portion includes a tubular portion, and
the penetrating portion is provided in the predetermined region such that the tubular portion of the mouth portion passes through the penetrating portion and the predetermined region is hooked on the tubular portion when the predetermined region is bent with the one portion as a bending line.

11. The gusset bag according to claim 10,
wherein the upper cut is located at a position on an upper side of the bending line.

12. The gusset bag according to claim 1,
wherein the mouth portion includes a tubular portion, and
the penetrating portion and the tubular portion of the mouth portion are disposed in line symmetry with respect to the one portion.

13. The gusset bag according to claim 1,
wherein the mouth portion includes a tubular portion, and
the tubular portion protrudes from an inside of the content storing portion to the outside of the content storing portion through an opening of the one flat surface portion.

* * * * *